Figure 1:
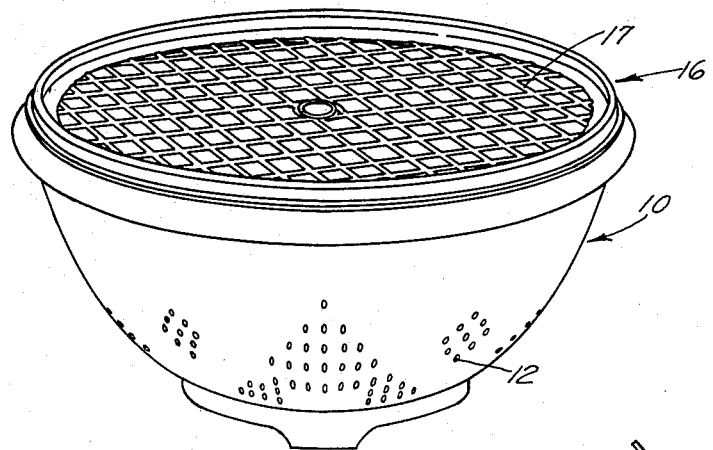

Feb. 23, 1965     J. B. SWETT     3,170,875
COLANDER

Filed March 12, 1962     2 Sheets-Sheet 1

INVENTOR.
JAMES B. SWETT
BY Harold R. Beck
ATTORNEY

Feb. 23, 1965   J. B. SWETT   3,170,875
COLANDER

Filed March 12, 1962   2 Sheets-Sheet 2

INVENTOR.
JAMES B. SWETT
BY Harold R. Beck
ATTORNEY

United States Patent Office 3,170,875
Patented Feb. 23, 1965

3,170,875
COLANDER
James B. Swett, Barrington, R.I., assignor to Rexall Drug and Chemical Company, Los Angeles, Calif., a corporation of Delaware
Filed Mar. 12, 1962, Ser. No. 179,000
1 Claim. (Cl. 210—465)

Colanders are well known for use in draining liquids from solids, washing fruits and vegetables, and similar operations in the kitchen. These known colanders are generally hemispherical in shape with downwardly depending legs for supporting the colander and a perforated bottom for drainage of fluids from the colander.

My invention is directed to a colander having a grill removably affixed over the open top of the colander. The grill encloses the hollow body of the colander thereby permitting agitation of solids within the colander for thorough washing or drainage without loss of the solids through the open top of the colander. The grill is of unique construction and design which permits simple affixation and removal of the grill to and from the colander. The colander and grill are fabricated from plastic which can be readily cleaned.

My invention is further directed to a unique perforated bottom on the colander having aesthetic appeal and which permits simple and inexpensive fabrication of the colander.

Figure 2:
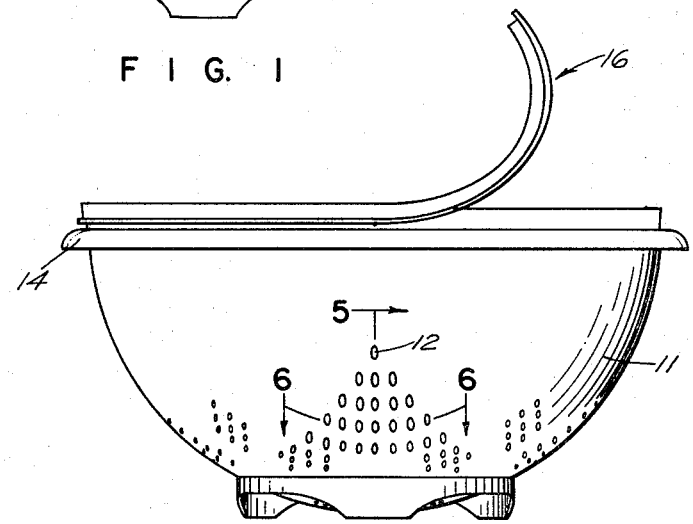
Figure 4:
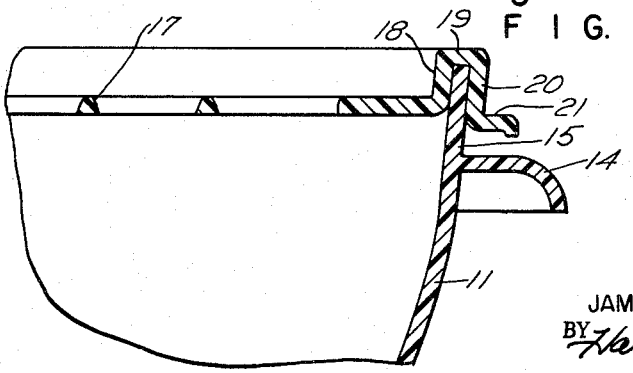
Figure 3:
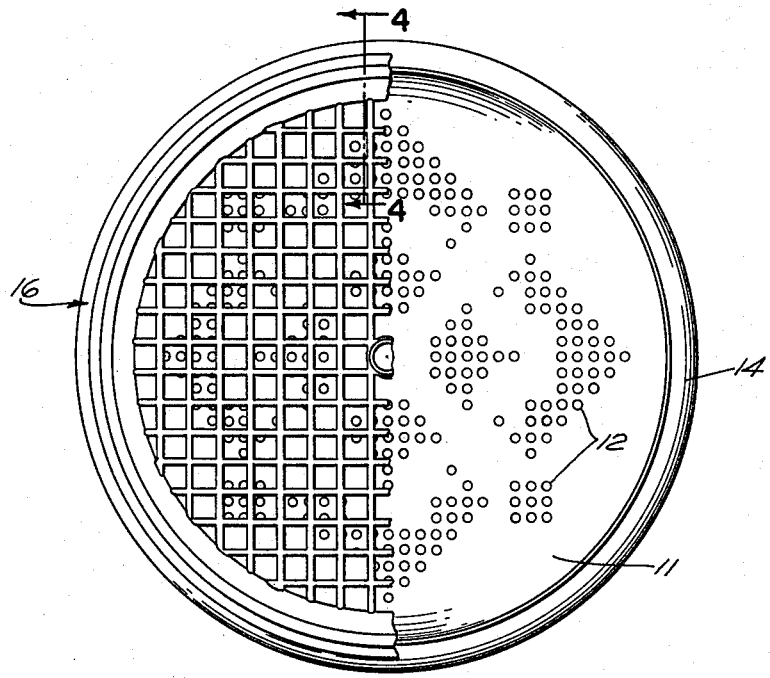
Figure 5:
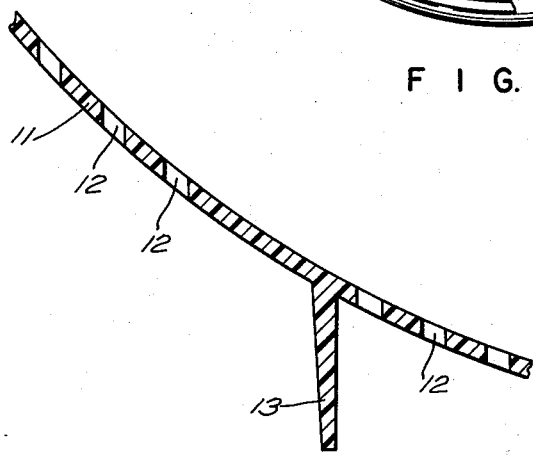
Figure 6:

In the drawings I have shown a present preferred embodiment of my invention in which:

FIGURE 1 is a perspective of my invention;
FIGURE 2 is a side elevation of my invention with the grill partially removed;
FIGURE 3 is a plan view of my invention with parts removed for clarity;
FIGURE 4 is a cross-section taken on line 4—4 of FIGURE 3;
FIGURE 5 is a cross-section taken on line 5—5 of FIGURE 2; and
FIGURE 6 is a cross-section taken on line 6—6 of FIGURE 2.

Briefly the present invention includes a colander having a hemispherical hollow container with continuous side and bottom walls, and an open top. The container has a plurality of perforations in the side and bottom walls and preferably the perforations are circular with the axis of rotation of each perforation positioned substantially parallel to the axis of rotation of the hemispherical container when the latter axis is located normal to the bottom of the hemisphere. The colander has legs to maintain it in an upright position when placed on a supporting surface. A grill is positioned across the open top of the colander and a sealing rim is integral with the periphery of the grill. A portion of the sealing rim is positioned over the upper edge of the side wall of the colander and tightly engages the outer surface of the side wall to maintain the grill in position across the open top. The grill is quickly and easily positioned on the colander by stretching the sealing rim over the upper edge of the colander. The grill is fabricated from regular or low density polyethylene thereby providing a resilient flexibility in the grill which insures proper sealing of the rim against the colander. Preferably the rim is an inverted U shape, the legs of the U being tightly engaged with each side of the side wall of the container to seal the rim and grill to the colander side wall.

Referring specifically to the drawings, the colander generally indicated by the numeral 10 includes a hollow container having a hemispherical continuous side and bottom wall 11. The upper edge of the side wall is slightly flared outwardly at 15. The side and bottom wall 11 is perforated by a plurality of holes 12 formed in a distinctive pattern as shown in FIGURES 1, 2 and 3. This pattern is decorative and useful in permitting free draining of the colander. The perforations 12 are made directly through the hemispherical wall 11 from a top position as viewed in FIGURE 3. Stated in another way, the axes of rotation of the circular perforations 12 are substantially parallel with the axis of rotation of the hemispherical container when the latter axis is located normal to the bottom of the container.

The colander is preferably fabricated from linear polyethylene or a blend of high and low density polyethylene, and therefore is very rigid.

A continuous scalloped leg 13 is integral with the under side of the container. The scallops in the leg are decorative and permit draining of the colander when it is positioned on a supporting surface. The legs 13 maintain the colander in an upright position as shown in FIGURE 2 when positioned on a supporting surface.

A continuous peripheral handle 14 is integral with the outside surface of the walls 11 near the upper edge of the wall. This handle 14 adds rigidity to the upper edge of the colander and provides a handle for manually lifting the colander.

A top grill generally designated as 16 includes a central open grill 17. The openings in the grill are each approximately ⅜" by ⅜" and the approximate thickness of the ribs is ³⁄₃₂" by ¹⁄₁₆". The grill is integral with a sealing rim having an inside upwardly directed wall 18, a connecting wall 19, and an outside downwardly directed wall 20. The lower edge of wall 20 has an outwardly directed flange 21 useful in removing the grill from the colander. The walls 18, 19 and 20 form an inverted U-shaped sealing rim which is positionable over the top of the flared portion 15 of the side wall 11. The flared portion 15 is about 5–13°, preferably 7–12° and best 10–12° from the vertical. The inside surfaces of walls 18 and 20 are substantially parallel to the flared portion 15 and engage the surfaces of the flared portions 15 thereby effecting a tight seal to the wall and maintaining the grill on the top of the colander. This type of connecting arrangement to an upper edge is well known as illustratively shown in Tupper Patent No. 2,487,400.

The specific dimensions of the ribs and grill openings are important in my invention in providing optimum stretch and flexibility to the grill since the entire grill and rim must be sufficiently stretchable to permit easy placement of the grill over the top edge of wall 11, but still maintain the grill in tight engagement with the upper edge so that the grill does not fall off when the colander is inverted during use. The grill must be flexible to permit easy removal of the grill from the colander as shown in FIGURE 2. In removing the grill, a portion of the rim is grasped between the fingers and an upward bending force is exerted by pulling up on flange 21 while pushing down on wall 18. In this manner, a portion of the rim is released from the top edge of wall 11 and the remainder of the rim is readily stripped off by pulling upward on the grill as shown in FIGURE 2.

In the assembled unit, it is important that the grill be taut across the opening in the colander. This is achieved by proper opening and rib dimensions.

While I have shown a present preferred embodiment of my invention, it may be otherwise embodied within the scope of the following claim.

I claim:

A colander including a hemispherical hollow container having a continuous side wall and open top, a plurality of relatively small diameter perforations in said side wall, the central axis of said perforations being substantially parallel to the axis of rotation of said hemisphere located normal to the bottom of the hemisphere; legs on the colander to maintain the colander in an upright position on a supporting surface; an open grill positioned across said open top, and a rim integral and continuous with the periphery of said grill, a portion of said rim being positioned over the upper edge of said side wall and tightly engaging the outer surface of the side wall to maintain the grill in position across the open top; said grill and rim being fabricated from resilient, flexible plastic wherein the upper portion of the side wall of the container is flared outwardly between about 5°–13° from the vertical; and said rim has an inverted U-shape with the legs of the U being substantially parallel to each other and conforming to the flared upper portion of the side wall of the container; said legs of the U being tightly engaged with each side of the side wall of the container to seal the rim and grill to the container side wall and to maintain said grill taut between said rim.

References Cited in the file of this patent

UNITED STATES PATENTS

| | | |
|---|---|---|
| 193,244 | Guillemin | July 17, 1887 |
| 1,134,837 | Fox | Apr. 6, 1915 |
| 2,541,094 | Pesenti | Feb. 13, 1951 |
| 2,649,991 | Woock | Aug. 25, 1953 |
| 2,663,428 | Hoagland | Dec. 22, 1953 |
| 2,816,589 | Tupper | Dec. 17, 1957 |

FOREIGN PATENTS

| | | |
|---|---|---|
| 928,222 | France | May 26, 1947 |
| 1,007,694 | Germany | May 2, 1957 |